(12) United States Patent
Taguchi et al.

(10) Patent No.: US 7,195,357 B2
(45) Date of Patent: Mar. 27, 2007

(54) IMAGE PROCESSING APPARATUS, IMAGE PROCESSING METHOD, AND IMAGE PROCESSING PROGRAM PRODUCT FOR CORRECTING PROJECTED IMAGES

(75) Inventors: Hiroyuki Taguchi, Isesaki (JP); Nobuhiko Omori, Ora-Gun (JP); Kouichiro Yanagi, Himeji (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 164 days.

(21) Appl. No.: 10/987,793

(22) Filed: Nov. 12, 2004

(65) Prior Publication Data
US 2005/0105058 A1 May 19, 2005

(30) Foreign Application Priority Data
Nov. 19, 2003 (JP) .............................. 2003-389909

(51) Int. Cl.
*G03B 21/14* (2006.01)

(52) U.S. Cl. ........................................................ 353/70
(58) Field of Classification Search ................. 353/69, 353/70
See application file for complete search history.

(56) References Cited

U.S. PATENT DOCUMENTS 7,036,940 B2 * 5/2006 Matsuda et al. .............. 353/70

* cited by examiner

*Primary Examiner*—William C. Dowling
(74) *Attorney, Agent, or Firm*—Osha Liang LLP

(57) ABSTRACT

Distortion of an image that is projected to a screen is suppressed by an image processing apparatus including a vertical reduction section for performing reduction and correction in the vertical direction with respect to image data of the projected image and a horizontal reduction section for performing reduction and correction in the horizontal direction with respect to image data on which reduction and correction were performed in the vertical reduction section.

7 Claims, 11 Drawing Sheets

IMAGE PROCESSING APPARATUS, IMAGE PROCESSING METHOD, AND IMAGE PROCESSING PROGRAM PRODUCT FOR CORRECTING PROJECTED IMAGES

CROSS-REFERENCE TO RELATED APPLICATION

The entire disclosure of Japanese Patent Application No.2003-389909 including specification, claims, drawings, and abstract is incorporated herein by reference in its entirety.

BACKGROUND OF THE INVENTION

1. Field of the Invention

The present invention relates to an image processing apparatus, an image processing method, and an image processing program product for reducing distortion when projecting images.

2. Description of the Related Art

To project an image onto a screen using an image projector apparatus, such as a screen projector, the image is often projected onto a screen 14 having a tilt angle β with respect to a normal projection direction 12 of a projector 10 as shown in FIG. 7.

As shown in FIG. 7, the image that is projected from the projector 10 is projected in a correct shape onto a vertical screen 16 that is perpendicular to the normal projection direction 12. However, as the projection angle Δα increases at the screen 14 having tilt angle β, the optical path length becomes longer, and as the optical path length becomes longer, an enlarged image is projected. Therefore, as shown in FIG. 8, an image 22 is projected with trapezoidal distortion with respect to an original image 20 projected onto the screen 16 that is perpendicular to the normal projection direction 12. Accordingly, trapezoidal correction processing is performed in advance on the image depending on the tilt angle β.

FIG. 9 shows a configuration of an image processing apparatus 100 of the related art for performing trapezoidal correction processing. The image processing apparatus 100 of the related art comprises an input section 32, a horizontal reduction section 34, a line memory controller 36, a line memory 38a, a line memory 38b, a vertical reduction section 40, a memory controller 42, a frame buffer 44, and an output section 46.

The input section 32 is an interface when receiving image data from the external image processing apparatus 100. As shown in FIG. 10, one screen of the input image data is composed of Nh pixels in the horizontal direction and Nv pixels in the vertical direction. For the purpose of convenience, the horizontal line that is projected along the normal projection direction 12 of the projector 10 is termed line number 0, and the line numbers increase in the manner of 1, 2, . . . , Nv as the projection angle Δα increases from 0° to the lens angle α.

At the horizontal reduction section 34, horizontal reduction processing is performed for reducing the number of pixels in the horizontal direction with respect to each horizontal line of the image data received by the input section 32. As shown in FIG. 7, when the projection angle Δα is 0°, namely, with respect to the horizontal line with line number 0, an optical path length L does not change to the screen 16 that is perpendicular to the normal projection direction 12 and to the screen 14 having tilt angle β with respect to the normal projection direction 12. On the other hand, when the projection angle Δα is the lens angle α, namely, with respect to the horizontal line with line number Nv, the optical path length r with respect to the screen 16 that is perpendicular to the normal projection direction 12 is L/cos α, and the optical path length R to the screen 14 having tilt angle β with respect to the normal projection direction 12 is expressed as L cos β/cos(α+β). Therefore, the number of corrected horizontal pixels Hn is calculated according to expression (1), and the horizontal line with line number Nv is reduced from Nh pixels to Hn corrected pixels in the horizontal direction.

$$Hn = Nh \times r/R = Nh \times \cos(\alpha+\beta)/\cos\alpha/\cos\beta \quad (1)$$

If the calculation results in a fraction below the decimal point, rounding is performed to yield an integer value. At this time, the number of pixels ΔHn to be reduced for each horizontal line with line number Ln can be obtained according to expression (2).

$$\Delta Hn = Ln \times (Nh - Hn)/Nv \quad (2)$$

The horizontal reduction section 34 receives, from an external source, setting data, such as lens angle α of the projector 10, tilt angle β, number of horizontal pixels Nh, line number Ln of the horizontal line being input, and so forth, performs processing to reduce the number of pixels in the horizontal line with line number Ln from Nh to Nh−ΔHn, and then outputs the result. In this case, as shown in FIG. 11A, as the projection angle Δα increases, the number of reduction pixels ΔHn increases. Therefore, as shown in FIG. 11B, an original rectangular image 50 is converted to a trapezoidal image 52 in which the number of pixels in the horizontal direction is reduced as the projection angle Δα increases. The image data processed by the horizontal reduction section 34 is transmitted one horizontal line at a time to the line memory controller 36.

The line memory controller 36 receives image data one pixel at a time. The received image pixel data is output to the vertical reduction section 40. Line memory 38a and 38b have at least the memory capacity to store and hold image data for the number of pixels in one horizontal line. Line memory 38a and 38b are controlled for first-in first-out (FIFO) by the line memory controller 36. When the line memory controller 36 receives image data for the next pixel, the image data for the last received pixel is stored and held into the FIFO controlled line memory 38a. The image data that overflows from the line memory 38a due to FIFO control is transferred to, then stored and held in FIFO-controlled line memory 38b. The line memory controller 36 reads out the image data for the previously received pixels only for one horizontal line and two horizontal lines with respect to the pixels received this time from the image data stored in line memory 38a and 38b, and this image data is output to the vertical reduction section 40. In this manner, the line memory controller 36 outputs to the vertical reduction section 40 the image data for the horizontal line currently being received and also outputs image data located at the same vertical position as the image data currently being received for the last horizontal line and the second to last horizontal line.

At the vertical reduction section 40 is performed vertical reduction processing for reducing the number of pixels of the image data in the vertical direction. As shown in FIG. 7, when the tilt angle is 0°, namely, with the screen 16 that is perpendicular to the normal projection direction 12, the image projected at lens angle α is projected with a length of X=L tan α in the vertical direction. On the other hand, with the screen 14 having tilt angle β with respect to the normal projection direction 12, the image projected at lens angle α is projected with a length of Y=L×(cos β×tan(α+β)−sin β) in the vertical direction. Therefore, the number of corrected vertical pixels Vn is calculated according to expression (3), and the number of pixels in the vertical direction of the image data is reduced from Nv pixels to Vn corrected pixels in the vertical direction.

$$Vn = Nv \times \tan \alpha / (\cos \beta \times \tan(\alpha+\beta) - \sin \beta) \quad (3)$$

Furthermore, the number of pixels ΔVn to be reduced for the number of vertical pixels $Nv_2(\Delta\alpha)$ existing from projection angle 0° to Δα can be obtained according to expression (4).

$$\Delta Vn(\Delta\alpha) = Nv_2(\Delta\alpha) \times \tan \Delta\alpha / (\cos \beta \times \tan(\Delta\alpha+\beta) - \sin \beta) \quad (4)$$

Therefore, the number of pixels ΔVn(Δα1, Δα2) to be reduced for the number of vertical pixels existing in a range of projection angles from Δα1 to Δα2 (where Δα1<Δα2) can be obtained according to expression (5).

$$\Delta Vn(\Delta\alpha 1, \Delta\alpha 2) = (Nv_2(\Delta\alpha 2) - \Delta Vn(\Delta\alpha 2)) - (Nv_2(\Delta\alpha 1) - \Delta Vn(\Delta\alpha 1)) \quad (5)$$

The vertical reduction section 40 obtains the range of projection angles Δα at which is projected the image for data of three horizontal lines received from the line memory controller 36. Furthermore, the vertical reduction section 40 receives, from an external source, setting data, such as lens angle α of the projector 10, tilt angle β, number of horizontal pixels Nv, and so forth, obtains the number of reduction pixels according to the expression (5) for the range of projection angles Δα at which is projected the image for the received data of three horizontal lines, and reduces the number of pixels in the vertical direction. If the calculation results in a fraction below the decimal point, rounding is performed to yield an integer value. At this time, as shown in FIG. 11B, the number of pixels ΔVn to be reduced increases as the projection angle Δα increases. Therefore, as shown in FIG. 11C, the trapezoidal image 52 is converted to a barrel-shaped trapezoidal image 54. The image data processed at the vertical reduction section 40 is transmitted to the memory controller 42.

The memory controller 42 temporarily stores and holds the image data, which was processed at the vertical reduction section 40, into the frame buffer 44. The output section 46 reads out the image data held in the frame buffer 44 by accessing the memory controller 42 and outputs it in a displayable format to the projector 10, which is externally connected to the image processing apparatus 100.

As described hereinbefore, image data can be converted to the barrel-shaped trapezoidal image 54 by sequentially performing the horizontal reduction processing and the vertical reduction processing on the image data. When the barrel-shaped trapezoidal image 54 is projected onto the screen 14 at the tilt angle β, an image 56 that is unchanged with barrel distortion on the left and right is projected. As the tilt angle β increases and the amount of correction in the trapezoidal correction processing increases, the bulging on the left and right in the image 56 that is projected also increases.

This type of image distortion is a major problem when it is desirable to accurately display data, such as diagrams, graphs, and so forth, using a projector.

SUMMARY OF THE INVENTION

The present invention is an image processing apparatus for correcting an image that is projected from a projector at a tilt angle in the vertical direction with respect to the normal projection direction of the projector, comprising a vertical reduction section for performing reduction correction in the vertical direction with respect to image data of the image and a horizontal reduction section for performing reduction correction in the horizontal direction with respect to image data on which reduction correction has been performed by vertical reduction section.

Another mode of the present invention is an image processing method for correcting an image that is projected from a projector at a tilt angle in the vertical direction with respect to the normal projection direction of the projector, comprising a vertical reduction process for performing reduction correction in the vertical direction with respect to image data of the image and a horizontal reduction process for performing reduction correction in the horizontal direction with respect to image data on which reduction correction has been performed in the vertical reduction process.

Another mode of the present invention is an image processing program product for correcting an image that is projected from a projector at a tilt angle in the vertical direction with respect to the normal projection direction of the projector, enabling a computer to function as an image processing apparatus comprising a vertical reduction section for performing reduction correction in the vertical direction with respect to image data of the image and a horizontal reduction section for performing reduction correction in the horizontal direction with respect to image data on which reduction correction has been performed by the vertical reduction section.

DETAILED DESCRIPTION OF THE PREFERRED EMBODIMENTS

Figure 1:
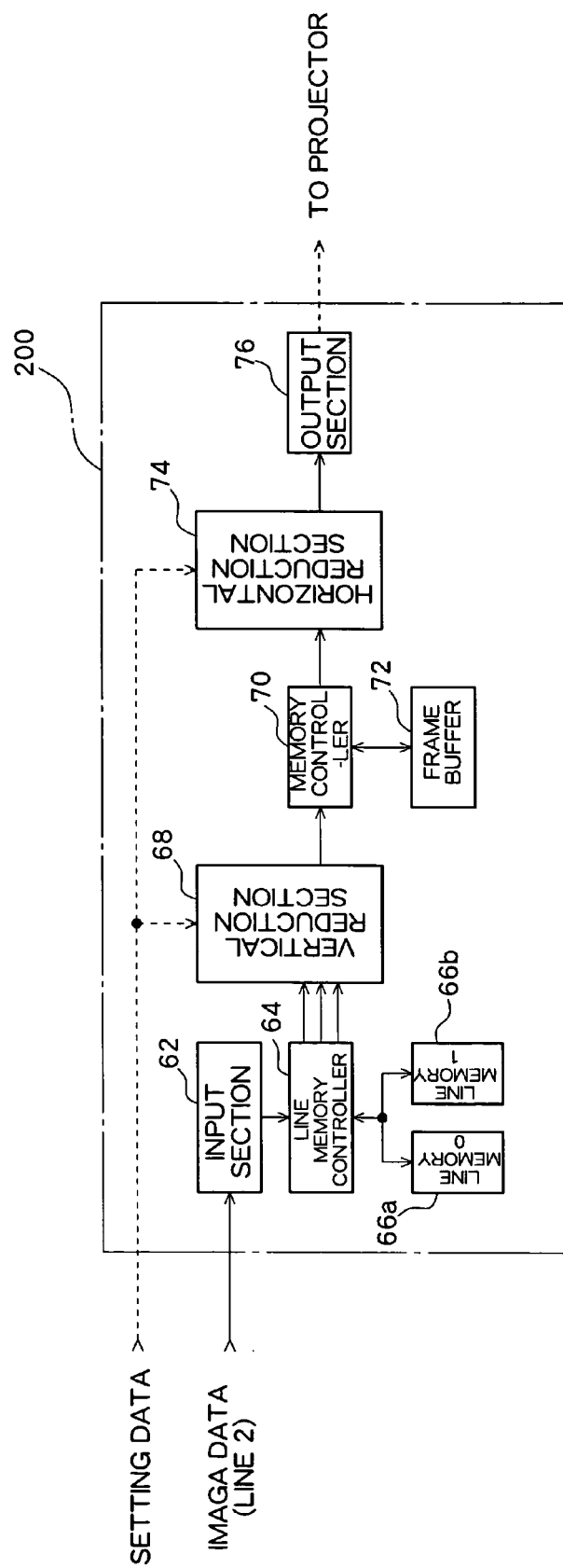
FIG. 1 is a block diagram showing a configuration of an image processing apparatus in an embodiment of the present invention.

As shown in FIG. 1, an image processing apparatus 200 in an embodiment of the present invention comprises an input section 62, a line memory controller 64, line memory 66a and 66b, a vertical reduction section 68, a memory controller 70, a frame buffer 72, a horizontal reduction section 74, and an output section 76.

Figure 10:
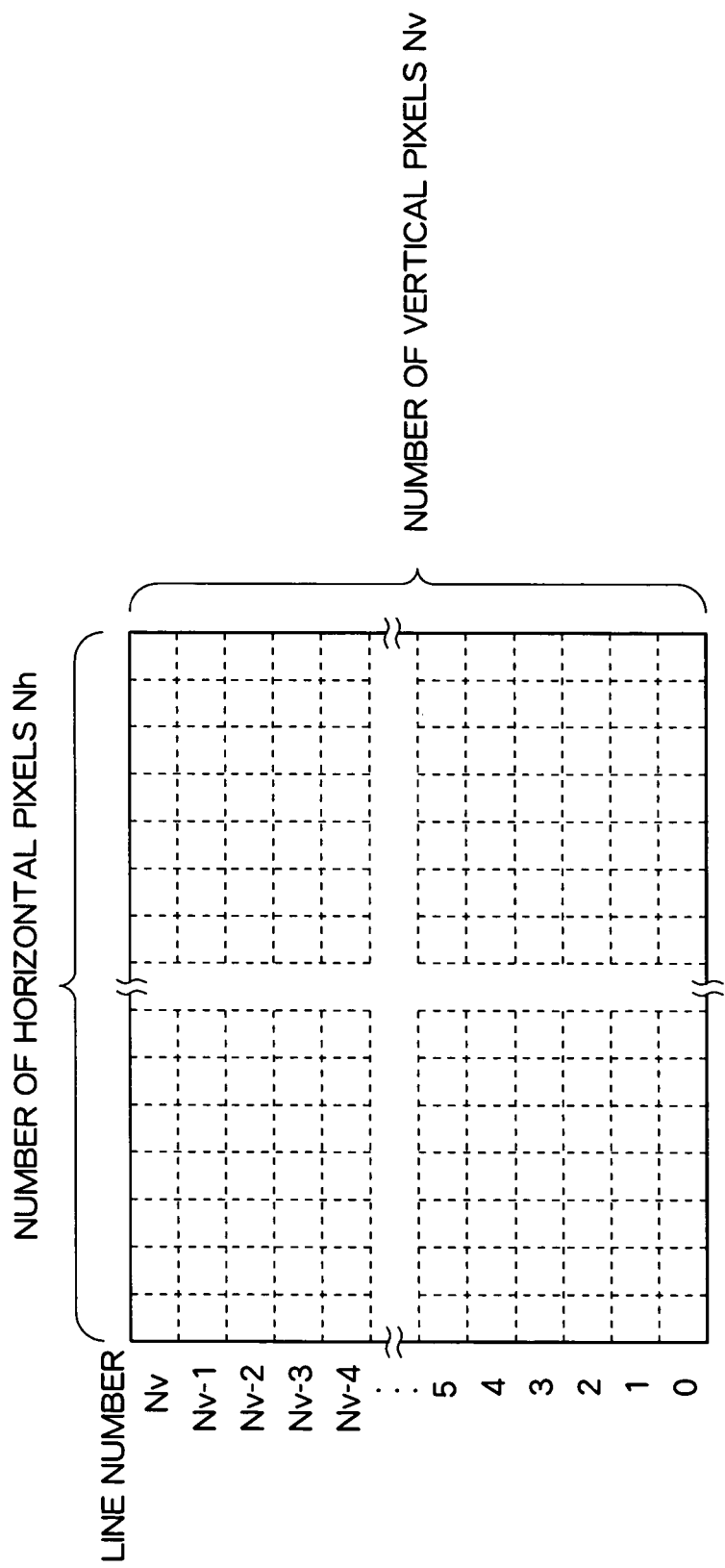
FIG. 10 illustrates the pixels that make up an image.
Figure 11A:
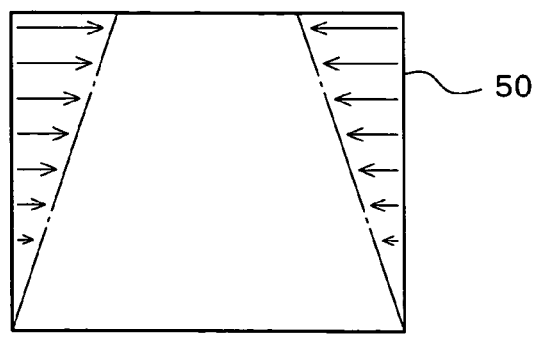
FIGS. 11A to 11C show images corrected by image correction processing in the background art.
Figure 11B:
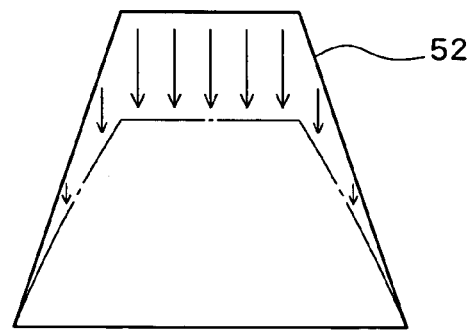
Figure 11C:
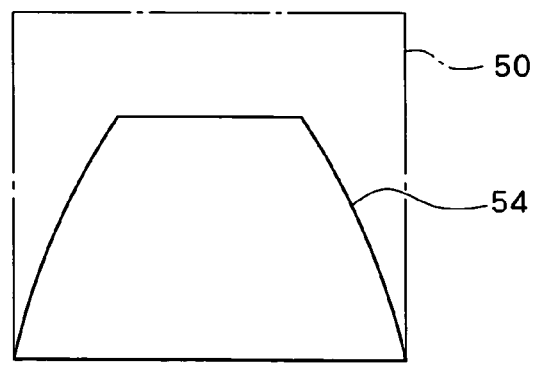
Figure 12:
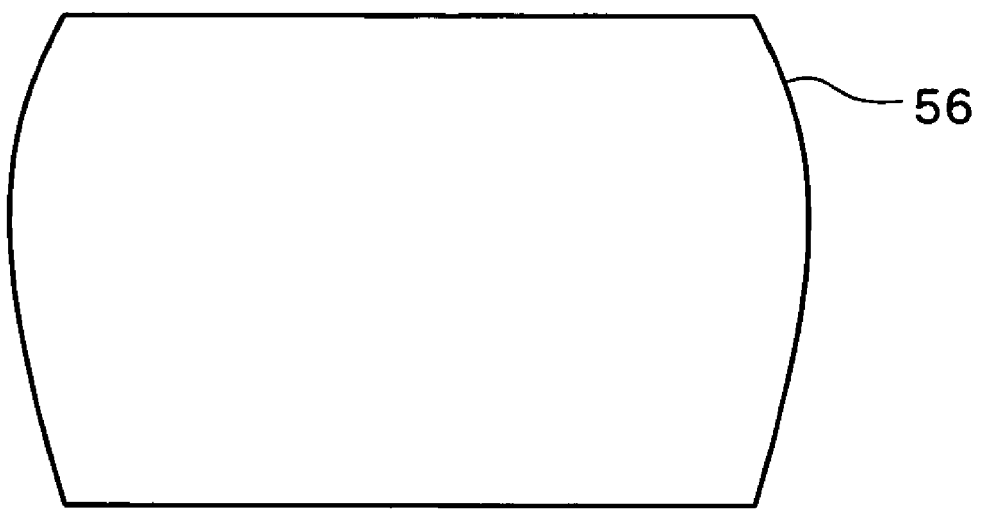
FIG. 12 shows the projected result of an image corrected by image correction processing in background technology.

The input section 62 is an interface when receiving image data from the external image processing apparatus 200. As shown in FIG. 10, one screen of the input image data is composed of Nh pixels in the horizontal direction and Nv pixels in the vertical direction. For the purpose of convenience in the description hereinafter, the horizontal line that is projected along the normal projection direction 12 of the projector 10 is termed line number 0, and the line numbers increase in the manner of 1, 2, . . . , Nv as the projection angle Δα increases from 0° to the lens angle α. The input section 62 sequentially receives image data one horizontal line at a time from line number 0 to line number Nv. At this time, image data for each horizontal line is sequentially received from horizontal pixel 0 to Nh. The received image data is transmitted from the input section 62 to the line memory controller 64.

The line memory controller 64 receives image data one pixel at a time. The received image pixel data is output to the vertical reduction section 68. Line memory 66a and 66b have at least the memory capacity to store and hold image data for the number of pixels in one horizontal line. Line memory 66a and 66b are controlled for first-in first-out (FIFO) by the line memory controller 64. When the line memory controller 64 receives image data for the next pixel, the image data for the last received pixel is stored and held into the FIFO controlled line memory 66a. The image data that overflows from the line memory 66a due to FIFO control is transferred to, then stored and held in FIFO-controlled line memory 66b. The line memory controller 64 reads out the image data for the previously received pixels only for one horizontal line and two horizontal lines with respect to the pixels received this time from the image data stored in line memory 66a and 66b, and this image data is output to the vertical reduction section 68. In this manner, the line memory controller 64 outputs to the vertical reduction section 68 the image data currently being received and also outputs the image data located at the same vertical position as the image data for the horizontal line currently being received for the last horizontal line and the second to last horizontal line.

Figure 2:
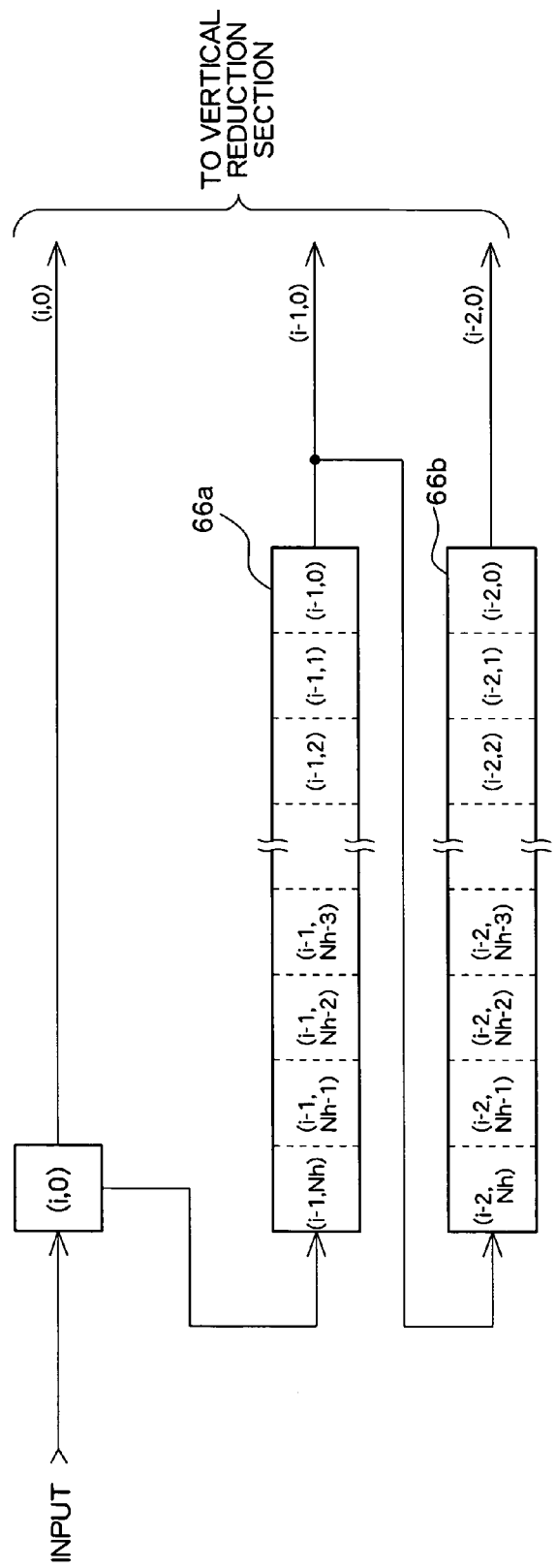
FIG. 2 illustrates line memory control in the embodiment of the present invention.

FIG. 2 schematically shows the function of the line memory controller 64 and the line memory 66a and 66b. In the example shown in FIG. 2, the line memory controller 64 receives and outputs to the vertical reduction section 68 the image data for the 0th pixel (i,0) in the horizontal line with line number i. To the line memory 66a is held the image data for pixels (i-1,0) to (i-1,Nh) in the horizontal line with line number i-1 preceding the pixel (i,0) currently being received. Furthermore, to the line memory 66b is held the image data for pixels (i-2,0) to (i-2,Nh) in the horizontal line with line number i-2, which is the second line preceding the pixel (i,0) currently being received. The line memory controller 64 outputs to the vertical reduction section 68 the image data for pixel (i,0) currently being received and also outputs the image data for pixels (i-1,0) and (i-2,0) at the same vertical position as the image data for pixel (i,0) currently being received among image data in the last horizontal line and the second to last horizontal line. When the line memory controller 64 receives the next pixel (i,1), the image data for pixel (i-2,0) held in the line memory 66b is discarded, and the individual image data items held in the line memory 66b are shifted in sequence to the right. Furthermore, the image data for pixel (i-1,0) held in the line memory 66a is stored into the left end of the line memory 66b, and the individual image data items held in the line memory 66a are shifted in sequence to the right. The image data for pixel (i,0) is then newly stored into the left end of the line memory 66a.

Figure 7:
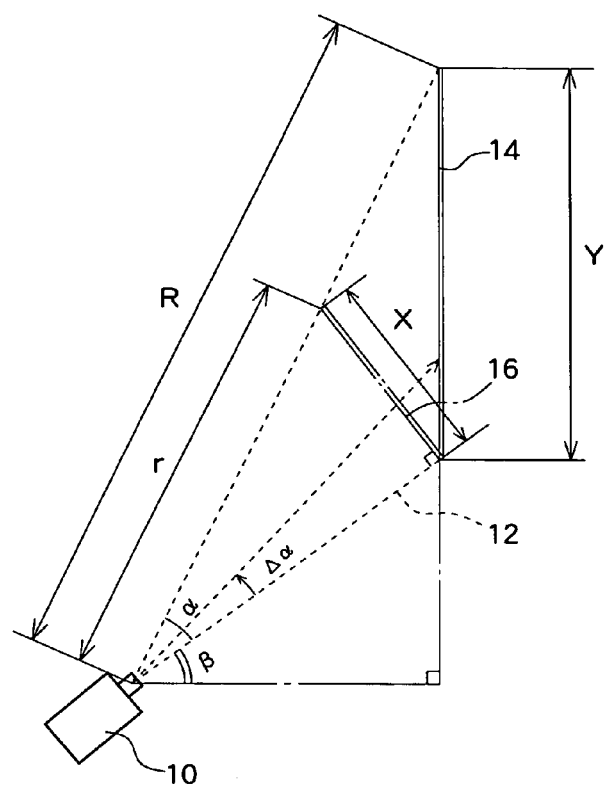
FIG. 7 shows the relationship between the projector and the screen.
Figure 8:
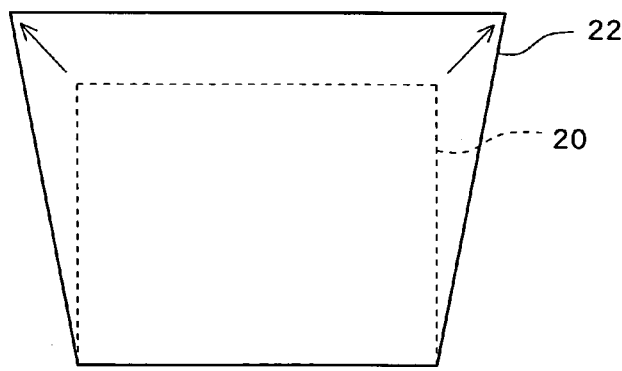
FIG. 8 shows an image projected with distortion onto the screen.
Figure 9:
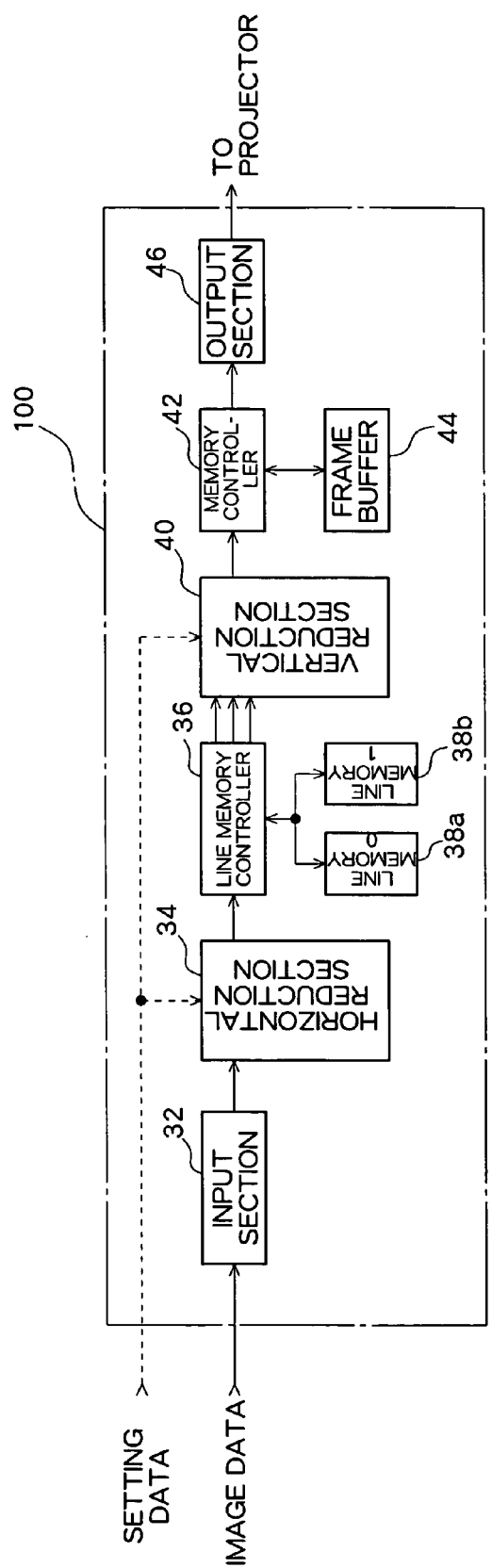
FIG. 9 is a block diagram showing a configuration of an image processing apparatus in the background art.

Vertical reduction processing is performed at the vertical reduction section 68 for reducing the number of pixels in the vertical direction of the image data. As shown in FIG. 7, when the tilt angle of the projector is 0°, namely, when the screen 16 that is perpendicular to the normal projection direction 12 is to be projected onto, the image projected at lens angle α is projected with a length of X=L tan α in the vertical direction. On the other hand, when the screen having tilt angle β with respect to the normal projection direction 12 is to be projected onto, the image projected at lens angle α is projected with a length of Y=L×(cos β×tan(α+β)−sin β) in the vertical direction. Therefore, the number of corrected vertical pixels Vn is calculated according to expression (3), and it is necessary to reduce the number of pixels in the vertical direction from Nv pixels to Vn corrected pixels in the vertical direction.

$$Vn = Nv \times \tan \alpha / (\cos \beta \times \tan(\alpha+\beta) - \sin \beta) \quad (3)$$

Figure 3A:
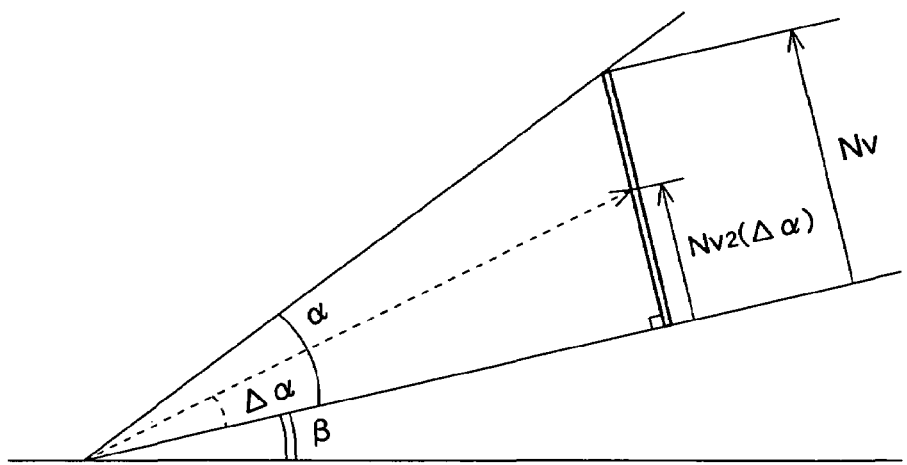
FIGS. 3A and 3B illustrate the reduction processing in the vertical direction in the embodiment of the present invention.
Figure 3B:
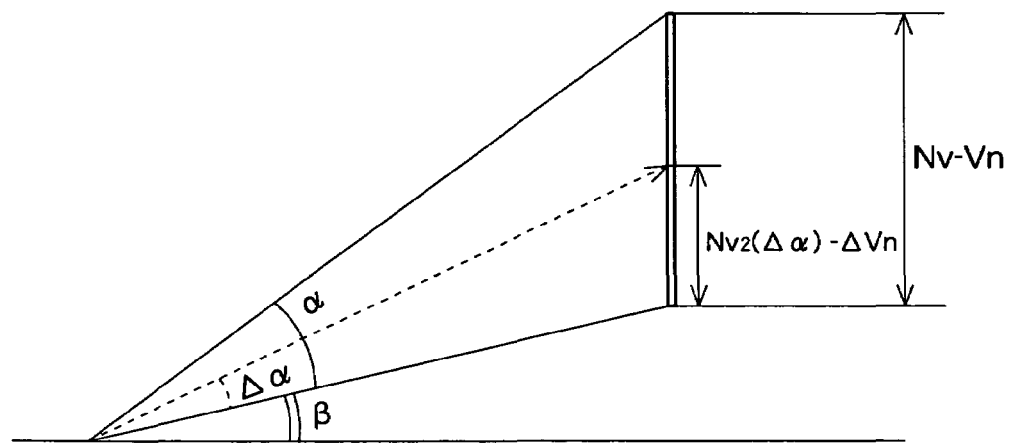

Furthermore, as shown in FIG. 3A, the number of pixels ΔVn to be reduced from correction for the number of vertical pixels $Nv_2(\Delta\alpha)$ existing from projection angle 0° to Δα prior to correction can be obtained according to expression (4). Therefore, after correction, as shown in FIG. 3B, correction is performed for reducing the number of pixels so that pixels $Nv_2(\Delta\alpha) - \Delta Vn$ are projected from projection angle 0° to Δα.

$$\Delta Vn(\Delta\alpha) = Nv_2(\Delta\alpha) \times \tan \Delta\alpha / (\cos \beta \times \tan(\Delta\alpha+\beta) - \sin \beta) \quad (4)$$

Therefore, the number of pixels ΔVn(Δα1, Δα2) to be reduced for the number of vertical pixels existing in a range of projection angles from Δα1 to Δα2 (where Δα1<Δα2) can be obtained according to expression (5).

$$\Delta Vn(\Delta\alpha 1, \Delta\alpha 2) = (Nv_2(\Delta\alpha 2) - \Delta Vn(\Delta\alpha 2)) - (Nv_2(\Delta\alpha 1) - \Delta Vn(\Delta\alpha 1)) \quad (5)$$

The vertical reduction section 68 obtains the range of projection angles Δα at which is projected the image for data of three horizontal lines received from the line memory controller 64. Furthermore, the vertical reduction section 68 receives, from an external source, setting data, such as lens angle α of the projector 10, tilt angle β, number of horizontal pixels Nv, and so forth, obtains the number of reduction pixels according to the expression (5) for the range of projection angles Δα at which is projected the image for the received data of three horizontal lines, and reduces the number of pixels in the vertical direction. If the calculation results in a fraction below the decimal point, rounding is performed to yield an integer value.

Figure 4:
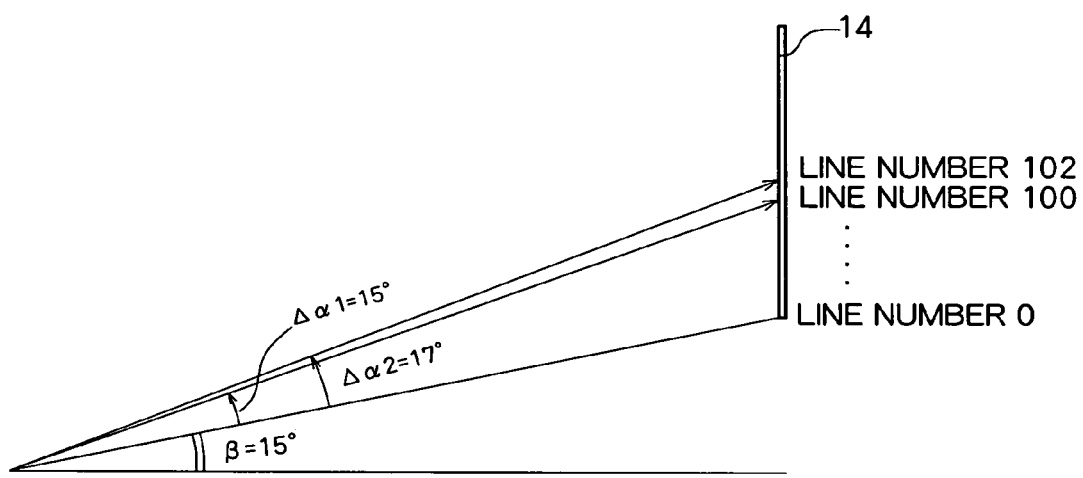
FIG. 4 illustrates a specific example of reduction processing in the vertical direction in the embodiment of the present invention.

For example, it is assumed the vertical reduction section 68 inputs the image data for pixels (102,0), (101,0), and (100,0) for line numbers 100 to 102. At this time, as shown in FIG. 4, when horizontal lines with line numbers 100 to 102 are to be projected toward a screen at a tilt angle of 15° from a projector in a range of projection angles Δα from Δα1=15° to Δα2=17°, ΔVn(Δα1) is approximately 89.7 and ΔVn(Δα2) is approximately 90.5. Since (102−90.5)−(100−89.7)=1.2, the number of pixels ΔVn(Δα1, Δα2) to be reduced for the three pixels existing in a range of projection angles from 15° to 17° can be estimated at one pixel. Therefore, correction is performed at the vertical reduction section 68 for reducing only one pixel from the three pixels in line numbers 100 to 102 to yield two pixels.

When reducing the number of pixels, for example, the image data for the pixels can be averaged to produce image data for new pixels. However, pixel reduction is not limited to this method.

Figure 5A:
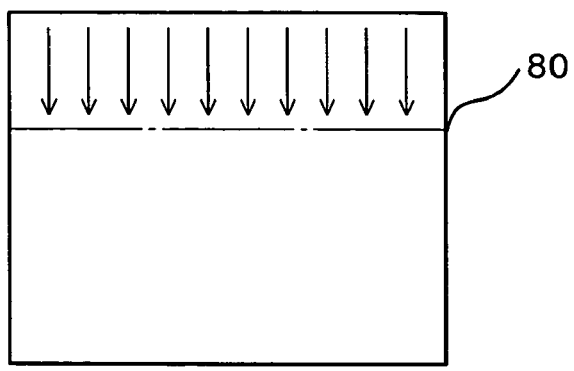
FIGS. 5A to 5C are images corrected by image correction processing in the embodiment of the present invention.
Figure 5B:
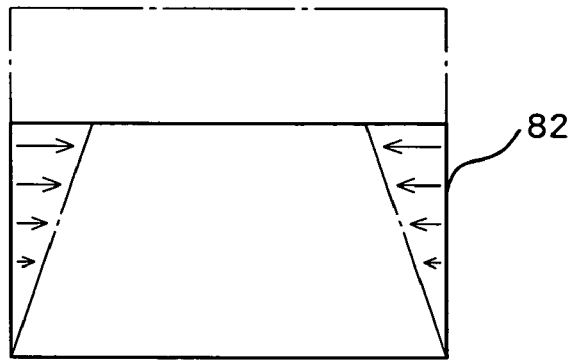

Due to vertical correction at the vertical reduction section 68, a rectangular image 80 shown in FIG. 5A is converted to an image 82 reduced in the vertical direction as shown in FIG. 5B. The image data processed at the vertical reduction section 68 is transmitted to the memory controller 70.

The memory controller 70 temporarily stores and holds the image data, which was processed at the vertical reduction section 68, into the frame buffer 72. The memory controller 70 reads out the image data stored in the frame buffer 72 and outputs the image data to the horizontal reduction section 74 at a timing at which the horizontal reduction section 74 is capable of performing horizontal reduction processing.

At the horizontal reduction section 74, horizontal reduction processing is performed for reducing the number of pixels in the horizontal direction with respect to each horizontal line of the image data. As shown in FIG. 7, when the projection angle Δα is 0°, namely, with respect to the horizontal line with line number 0, the optical path length does not change to the screen 16 that is perpendicular to the normal projection direction 12 and to the screen 14 having tilt angle β with respect to the normal projection direction 12. On the other hand, when the projection angle Δα is the lens angle α, namely, with respect to the horizontal line with line number Nv, the optical path length r with respect to the screen 16 that is perpendicular to the normal projection direction 12 is L/cos α, and the optical path length R to the screen 14 having tilt angle β with respect to the normal projection direction 12 is expressed as L cos β/cos(α+β). Therefore, the number of corrected horizontal pixels Hn is calculated according to expression (1), and the horizontal line with line number Nv is reduced from Nh pixels to Hn corrected pixels in the horizontal direction.

$$Hn = Nh \times r/R = Nh \times \cos(\alpha+\beta)/\cos \alpha/\cos \beta \quad (1)$$

At this time, the number of pixels ΔHn to be reduced for each horizontal line with line number Ln can be obtained according to expression (2).

$$\Delta Hn = Ln \times (Nh - Hn)/Nv \quad (2)$$

The horizontal reduction section 74 receives, from an external source, setting data, such as lens angle α of the projector 10, tilt angle β, number of horizontal pixels Nh, line number Ln of the horizontal line being input, and so forth, performs processing to reduce the number of pixels in the horizontal line with line number Ln from Nh to Nh-ΔHn, and then outputs the result. If the calculation results in a fraction below the decimal point, rounding is performed to yield an integer value.

Figure 6:
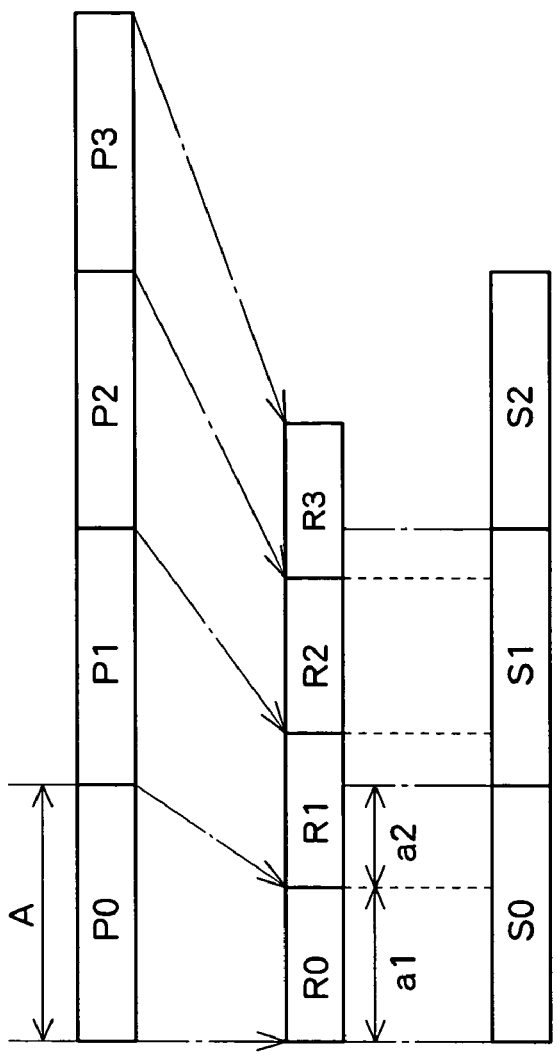
FIG. 6 illustrates the reduction processing in the horizontal direction in the embodiment of the present invention.

Reduction processing in the horizontal direction can be performed by generating interpolated data for each image data item with a central point in the horizontal direction of each horizontal line as a reference point. The average pixel method can be adopted in the generation of interpolated data. FIG. 6 shows a method of generating interpolated data using the average pixel method. First, simple reduction is performed on the size of the original pixels P0 to P3 shown in FIG. 6(a) to generate simple reduced pixels R0 to R3. Then, simple reduced pixels that overlap with the areas of the original pixels are obtained. The pixel data items of the simple reduced pixels are averaged with weighting given to the proportion of the overlapped areas to yield reduced pixel data S0 to S2 shown in FIG. 6(c). For example, in FIG. 6, the S0 pixel data becomes P0 pixel data×a1/A+P1 pixel data×a2/A.

Figure 5C:
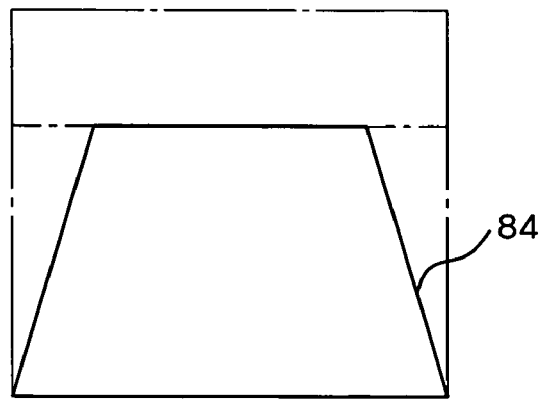

In the horizontal reduction processing of the horizontal reduction section 74, as shown in FIG. 5B, as the projection angle Δα increases, the number of reduction pixels LHn increases. Therefore, as shown in FIG. 5C, the image 82 is converted to a trapezoidal image 84 in which the number of pixels in the horizontal direction is reduced as the projection angle Δα increases. The image data processed by the horizontal reduction section 74 is transmitted to the output section 76.

The output section 76 outputs the image data processed by the image processing apparatus 200 in a format that is displayable by the projector.

When the image 84 of FIG. 5C is projected onto the screen 14 at tilt angle β, a rectangular image without barrel distortion is projected.

As shown hereinabove, by sequentially performing vertical reduction processing and horizontal reduction processing on the image data, trapezoidal correction processing can be performed so that image data is not rendered as a barrel-shaped trapezoidal image. Namely, barrel distortion of images, such as from a projector, that are projected onto a screen can be suppressed. Therefore, data, such as diagrams, graphs, and so forth, can be accurately displayed using a projector.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image processing apparatus for correcting an image that is projected from a projector at a tilt angle in the vertical direction with respect to the normal projection direction of the projector, comprising:
   a vertical reduction section for performing reduction correction in the vertical direction with respect to image data of said image; and
   a horizontal reduction section for performing reduction correction in the horizontal direction with respect to image data on which reduction correction has been performed by said vertical reduction section, wherein said image data comprise pixel data of pixels arranged in a matrix;
   when said tilt angle is angle β,
   said vertical reduction section computes the number of corrected vertical pixels Vn with respect to the number of pixels Nv in the vertical direction existing from projection angle 0° to α as follows $$Vn = Nv \times \tan \alpha/(\cos \beta \times \tan(\alpha+\beta) - \sin \beta)$$

performs vertical correction processing by reducing said number of pixels Nv to said number of corrected vertical pixels Vn.

2. An image processing apparatus for correcting an image that is projected from a projector at a tilt angle in the vertical direction with respect to the normal projection direction of the projector, comprising:
   a vertical reduction section for performing reduction correction in the vertical direction with respect to image data of said image; and
   a horizontal reduction section for performing reduction correction in the horizontal direction with respect to image data on which reduction correction has been performed by said vertical reduction section, wherein:
   said image data comprise pixel data of pixels arranged in a matrix;
   when said tilt angle is angle β,
   said vertical reduction section computes the number of pixels ΔVn(Δα) to be reduced with respect to the number of vertical pixels Nv$_2$(Δα) existing from projection angle 0° to Δα as follows $$\Delta Vn(\Delta\alpha) = Nv_2(\Delta\alpha) \times \tan\Delta\alpha/(\cos\beta \times \tan(\Delta\alpha+\beta) - \sin\beta)$$

computes the number of pixels ΔVn(Δα1, Δα2) to be reduced with respect to the number of vertical pixels existing in a range of projection angles from Δα1 to Δα2 (where Δα1<Δα2) as follows $$\Delta Vn(\Delta\alpha 1, \Delta\alpha 2) = (Nv_2(\Delta\alpha 2) - \Delta Vn(\Delta\alpha 2)) - (Nv_2(\Delta\alpha 1) - \Delta Vn(\Delta\alpha 1))$$

performs vertical correction processing by reducing the number of vertical pixels existing in a range of projection angles from Δα1 to Δα2 (where Δα1<Δα2) by only ΔVn(Δα1, Δα2) pixels.

3. An image processing apparatus for correcting an image that is projected from a projector at a tilt angle in the vertical direction with respect to the normal projection direction of the projector, comprising:
  a vertical reduction section for performing reduction correction in the vertical direction with respect to image data of said image; and
  a horizontal reduction section for performing reduction correction in the horizontal direction with respect to image data on which reduction correction has been performed by said vertical reduction section, wherein:
  said image data comprise pixel data of pixels arranged in a matrix;
  when said tilt angle is angle β,
  said horizontal reduction section computes the number of corrected horizontal pixels Hn with respect to the number of pixels Nh in the horizontal direction as follows $$Hn = Nh \times \cos(\alpha+\beta)/\cos\alpha/\cos\beta$$

performs horizontal correction processing by reducing said number of pixels Nh to said number of corrected horizontal pixels Hn.

4. An image processing method for correcting an image that is projected from a projector at a tilt angle in the vertical direction with respect to the normal projection direction of the projector, comprising:
  a vertical reduction process for performing reduction correction in the vertical direction with respect to image data of said image; and
  a horizontal reduction process for performing reduction correction in the horizontal direction with respect to image data on which reduction correction has been performed in said vertical reduction process, wherein said image data comprise pixel data of pixels arranged in a matrix;
  when said tilt angle is angle β,
  at said vertical reduction process, the number of corrected vertical pixels Vn with respect to the number of pixels Nv in the vertical direction existing from projection angle 0° to α is computed as follows $$Vn = Nv \times \tan\alpha/(\cos\beta \times \tan(\alpha+\beta) - \sin\beta)$$

vertical correction processing is performed by reducing said number of pixels Nv to said number of corrected vertical pixels Vn.

5. An image processing method for correcting an image that is projected from a projector at a tilt angle in the vertical direction with respect to the normal projection direction of the projector, comprising:
  a vertical reduction process for performing reduction correction in the vertical direction with respect to image data of said image; and
  a horizontal reduction process for performing reduction correction in the horizontal direction with respect to image data on which reduction correction has been performed in said vertical reduction process, wherein:
  said image data comprise pixel data of pixels arranged in a matrix;
  when said tilt angle is angle β,
  at said horizontal reduction process, the number of corrected horizontal pixels Hn with respect to the number of pixels Nh in the horizontal direction is computed as follows $$Hn = Nh \times \cos(\alpha+\beta)/\cos\alpha/\cos\beta$$

horizontal correction processing is performed by reducing said number of pixels Nh to said number of corrected horizontal pixels Hn.

6. A computer readable medium containing image processing instructions for correcting an image that is projected from a projector at a tilt angle in the vertical direction with respect to the normal projection direction of the projector, enabling a computer to function as an image processing apparatus, the image processing apparatus comprising:
  a vertical reduction section for performing reduction correction in the vertical direction with respect to image data of said image; and
  a horizontal reduction section for performing reduction correction in the horizontal direction with respect to image data on which reduction correction has been performed by said vertical reduction section, wherein said image data comprise pixel data of pixels arranged in a matrix;
  when said tilt angle is angle β,
  at said vertical reduction section, the number of corrected vertical pixels Vn with respect to the number of pixels Nv in the vertical direction existing from projection angle 0° to α is computed as follows $$Vn = Nv \times \tan\alpha/(\cos\beta \times \tan(\alpha+\beta) - \sin\beta)$$

vertical correction processing is performed by reducing said number of pixels Nv to said number of corrected vertical pixels Vn.

7. A computer readable medium containing image processing instructions for correcting an image that is projected from a projector at a tilt angle in the vertical direction with respect to the normal projection direction of the projector, enabling a computer to function as an image processing apparatus, the image processing apparatus comprising:
  a vertical reduction section for performing reduction correction in the vertical direction with respect to image data of said image; and
  a horizontal reduction section for performing reduction correction in the horizontal direction with respect to image data on which reduction correction has been performed by said vertical reduction section, wherein:
  said image data comprise pixel data of pixels arranged in a matrix;
  when said tilt angle is angle β,
  at said horizontal reduction section, the number of corrected horizontal pixels Hn with respect to the number of pixels Nh in the horizontal direction is computed as follows $$Hn = Nh \times \cos(\alpha+\beta)/\cos\alpha/\cos\beta$$

horizontal correction processing is performed by reducing said number of pixels Nh to said number of corrected horizontal pixels Hn.

* * * * *